Dec. 5, 1939.  W. WALLAT  2,181,954
SPRING
Filed Nov. 27, 1937
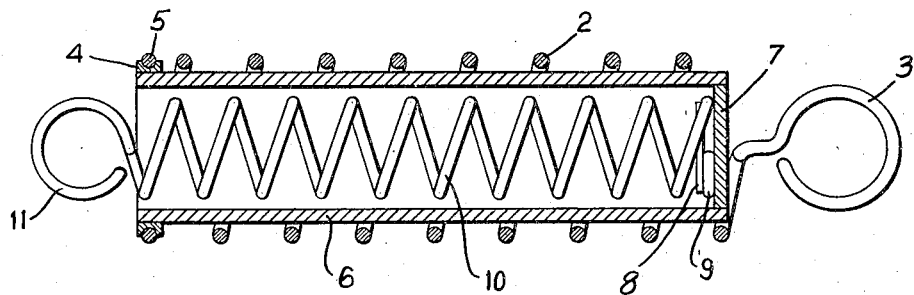
INVENTOR
Wilhelm Wallat
BY
ATTORNEY Patented Dec. 5, 1939

2,181,954

UNITED STATES PATENT OFFICE 2,181,954

SPRING

Wilhelm Wallat, Berlin-Schoneberg, Germany, assignor to International Business Machines Corporation, New York, N. Y., a corporation of New York Application November 27, 1937, Serial No. 176,861
In Germany November 28, 1936

1 Claim. (Cl. 267—1)

This invention relates to helical springs and has for its principal object to provide a spring having the characteristics of a substantially long spring which will permit of a substantially long stretch but in which the normal length of the spring with no stress is substantially half as long as a single helical spring would normally be to provide the length of stretch desired.

Further objects of the instant invention reside in any novel feature of construction or operation or novel combination of parts present in the embodiment of the invention described and shown in the accompanying drawing whether within or without the scope of the appended claim and irrespective of other specific statements as to the scope of the invention contained herein.

In order to provide a helical spring with high tension capacity relative to the diameter of the spiral winding it is necessary to have as many turns as possible and the length of the spring has to be of a length proportional to the stretch required or the spring will be stretched beyond its elastic limit and lose its strength.

Such a condition may prevail in the field on mechanics where a member is to be restrained by a spring and in which the movement of the member is relatively large in comparison with the space permitted between the member and the anchor position of the spring so that it is impossible to introduce a single helical spring in such a space of sufficient length to accommodate the required stretch.

To meet such a condition the present invention provides a helical spring 2, having a loop 3 formed in one end to facilitate attachment to a mechanical member, and having its opposite end anchored in a ring 4 provided with an annular groove to conform with the final coil 5 of the spring. The annular ring 4 is rigidly fixed to one end of a tubular member 6 having an outside diameter slightly less than the inside diameter of the helical coil. This tube is hollow and is disposed with its axis substantialy coincidental with the axis of the helix so that the coils of the helix are disposed longitudinaly along the periphery of the tube so that the coils may move longitudinally with respect to the tube when the spring is stretched. The difference between the outside diameter of the tube and the inside diameter of the helix is sufficient to permit the necessary contraction of the coils when the spring is stretched.

A plug 7 is fitted into the hollow end of the tube opposite to the end at which the spring 2 is anchored. The plug may be fixed securely in this tube by any suitable and well known means. The plug is provided with an extension 8 integral therewith which has an annular groove in which is anchored the end coil 9 of a helical spring 10.

The helical spring 10 has an outside diameter substantially less than the inside diameter of the tube 7 and the spring is disposed within the tube with the axis of the helix coincidental with the axis of the tube. The opposite end of the spring 10 extends beyond the end of the tube 7 and is provided with a loop 11 to facilitate attachment to a mechanical member.

It will be seen therefore that effective stress and stretch of the double spring may be equivalent to a single spring of substantially twice the length or if a single spring the same length as the double spring were to be used, the stretch and stress of each spring of the double springs would only be 50% of that of a single spring of the same overall length as the double spring.

While the fundamental and novel features of the invention as applied to a single modification have been shown, described and pointed out, it will be understood that various omissions and substitutions and changes in the form and details of the device illustrated may be made by those skilled in the art without departing from the spirit of the invention. I intend, therefore, to be limited only as indicated by the scope of the following claim.

What is claimed is as follows:

A spring unit comprising a guide tube, a plate fixed into one end to provide a closed base for one end of the tube while the other end of the tube remains open, the plate or base being integrally formed with a spring anchoring portion, a helical spring surrounding the tube and substantially of the same length as the tube and anchored to the outer wall of the tube adjacent the open end thereof, another helical spring housed inside the tube with one end thereof anchored to the center portion of the inside face of the tube base plate, the free ends of the springs extending beyond the ends of the tube opposite the ends to which they are anchored and whereby both free ends may be simultaneously pulled in opposite directions while the tube is stationary and without tending to rotate the tube.

WILHELM WALLAT.